Jan. 27, 1942     K. SCHÄFER     2,271,310
VEHICLE BODY
Filed April 23, 1938     2 Sheets-Sheet 1
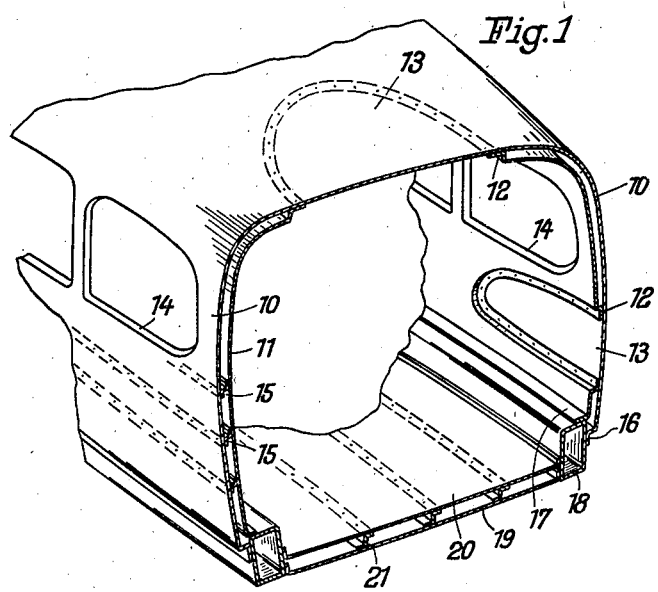
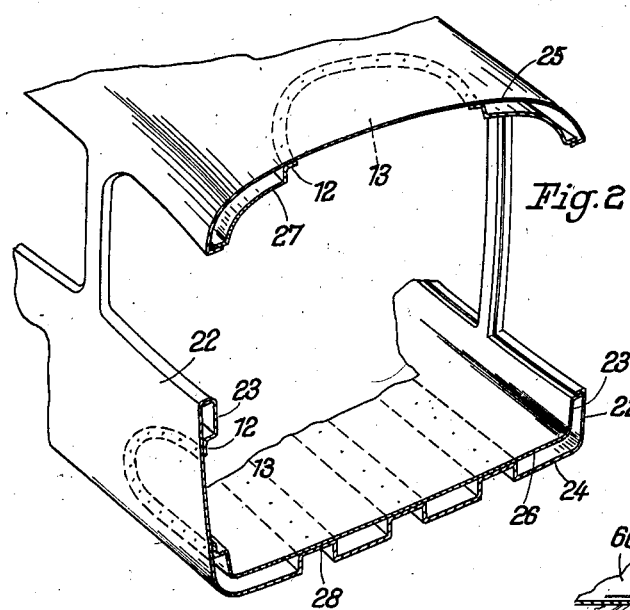
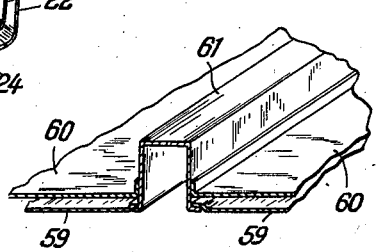
Inventor:
KURT SCHÄFER.
By John P. Tarbox
Attorney Jan. 27, 1942.   K. SCHÄFER   2,271,310
VEHICLE BODY
Filed April 23, 1938   2 Sheets-Sheet 2
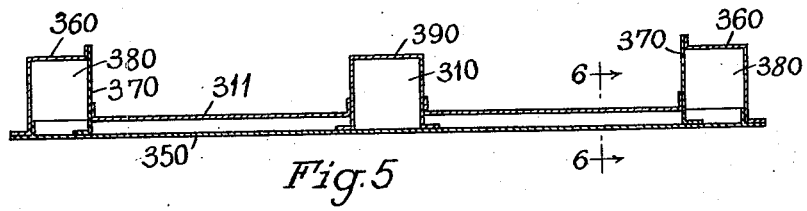
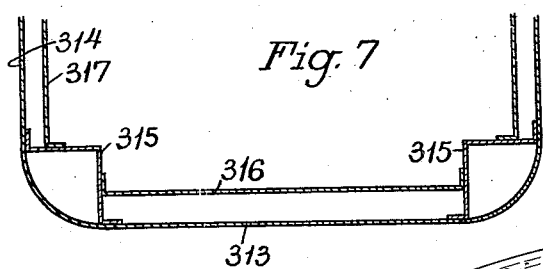
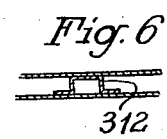
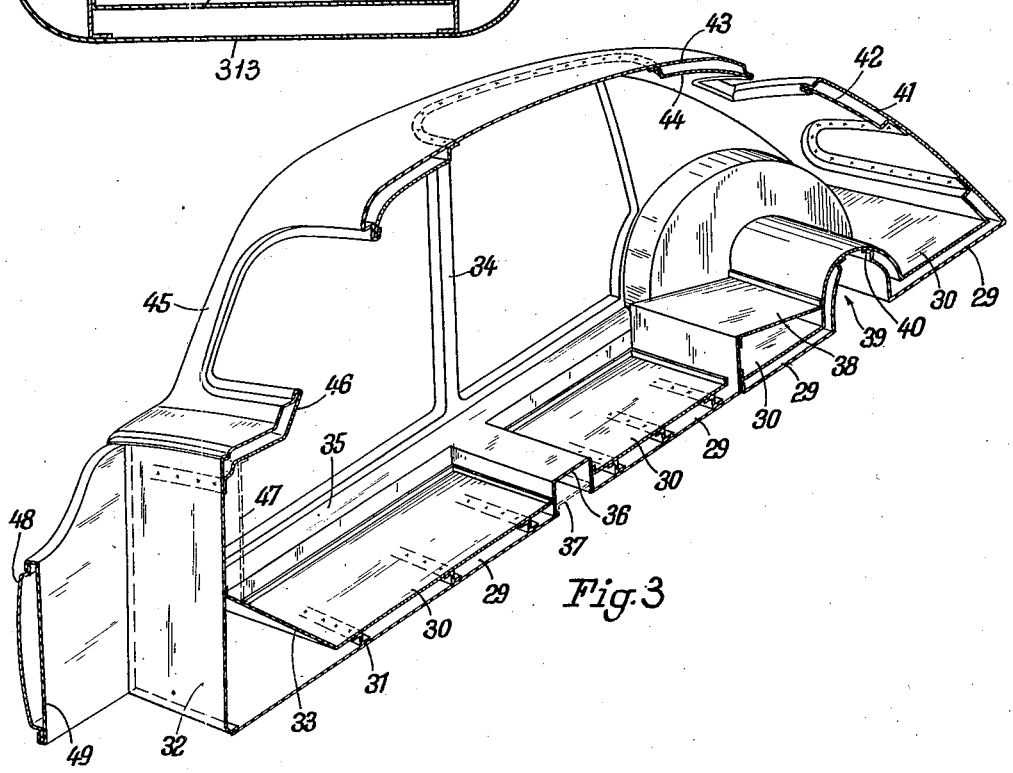
Inventor:
KURT SCHÄFER.
By John P. Tarbox
Attorney Patented Jan. 27, 1942

2,271,310

UNITED STATES PATENT OFFICE 2,271,310

VEHICLE BODY

Kurt Schäfer, Berlin-Eichkamp, Germany, assignor to the firm Edward G. Budd Manufacturing Company, Philadelphia, Pa.

Application April 23, 1938, Serial No. 203,883
In Germany April 24, 1937

3 Claims. (Cl. 296—28)

My invention relates to vehicle bodies and more particularly to an automobile body.

The object of my invention is to provide a self-sustaining body for vehicles, more particularly automotive vehicles, which combines superior rigidity and simplicity of design with reduced weight and is inexpensive in manufacture and repair.

Further objects of my invention will appear from the description of a number of various embodiments thereof and the features of novelty will be pointed out in the claims. These embodiments are illustrated in the accompanying drawings.

Fig. 1 is a fragmentary perspective view of a vehicle body partly in section along a vertical transverse plane.

Fig. 2 is a view similar to Fig. 1, yet of a modified form.

Fig. 3 is a perspective fragmentary view of a third modification of an automobile body in section along the vertical longitudinal middle plane.

Fig. 4 is a perspective fragmentary view of the middle portion of another modification of a body underframe structure partly in section along a transverse vertical plane.

Fig. 5 is a transverse section through still another modification of a body underframe structure in section along a transverse vertical plane.

Fig. 6 is a fragmentary section along line 6—6 of Fig. 5.

Fig. 7 is a section along a transverse vertical plane through the underframe portion of one further modification of the invention.

My invention relates to the body of vehicles, more particularly automotive vehicles, and is especially concerned with self-sustaining bodies. I found that a very rigid and yet light structure may be obtained by so constructing the floor section that it may form one of the main bearing elements of the body. In the vehicle bodies according to the invention, the bottom unit is provided with a double-walled floor providing for a perfectly flat outer surface. Preferably the floor panels are inserted between box-shaped side sills so as to lie flush with the bottom walls thereof. The upper one of the two floor panels is connected with the inner wall of the longitudinal sills.

Such structure results in a very low position of the floor of the body, in an efficient protection against cold and heat and in a flat and smooth lower surface of the body facilitating the unobstructed passage of the air.

The floor sections interposed between the side sills constitute a box-shaped beam considerably reinforcing the body against bending and warping stresses. This reinforcement permits a reduction of the side sills in height as compared with bottom units of known construction. The reduction in height of the side sills results in a more convenient entrance through the door openings.

My improved bottom unit may be used as a vehicle frame in vehicles of the type in which it is the frame alone that transmits the loads to the front and rear wheels. Preferably, however, I combine my improved bottom unit with the improved top unit to be described and claimed in a divisional application of this present application. In such combination, the vertical dimensions of the side sills may be reduced to a minimum whereby the upper edge of the side sills confining the door openings may be placed at a very low level.

In combining the side walls with the improved bottom unit and top unit I prefer to extend the inner and outer shell of the bottom and/or the top gradually without interruption into the outer and inner sheet of the side walls. Similarly, the outer and inner shell of the top and the bottom may be gradually extended without interruption into the two sheets of a front wall or a rear wall. This will be described hereinafter with reference to Fig. 1.

In the body illustrated in Figure 1, the top and the adjoining side walls comprise an outer shell 10 and an inner shell 11 in such a manner as to constitute a double wall extending continuously over the sides and the roof. For mutually supporting the outer and the inner shell and for reducing the weight and saving material, the inner shell is provided with offset flanges 12 attached to the outer shell, e. g. by spot welding, and is provided with large recesses 13. Moreover the outer shell and the inner shell are interconnected by flanges 14 surrounding the window openings and/or the door openings and being arranged in nested relationship. The outer and the inner shell may be reinforced and interconnected by interposed spacers, e. g. by Z-profiled bars 15, as shown at the left of Fig. 1.

At the bottom, the outer shell and the inner shells are provided with marginal flanges 16 and 17 connected with the walls of a box-shaped side sill or beam 18. Between the beams 18 the inner panel 20 and the outer panel 19 of the floor are interposed, the two panels being reinforced by interposed spacers 21.

In the embodiment shown in Fig. 2 the external shell 22 and the internal shell 23 of the side walls gradually extend into the external and internal shells 24, 25 and 26, 27 of the bottom and the top.

Thus it will be apparent that the body consists of double walls gradually extending into each other all around.

In the roof and below the window openings the inner shell 23, 27 may be provided with connecting flanges 12 and recesses 13, as described with reference to Fig. 1. The outer shell 24 of the bottom is formed with longitudinal channels 28 abutting against the inner shell 23 of the floor and connected therewith.

In the embodiment shown in Fig. 3 the cross sectional design of the side walls of the top and of the side sills reinforcing the bottom may be substantially the same as that described hereinabove with reference to Fig. 1. The outer panel 29 and the inner panel 30 of the floor, however, are reinforced by interposed transverse bars 31. In the neighborhood of the dash board 32 the inner floor panel 30 has a slanting extension 33 forming the toe-board. In this manner a box-shaped transverse beam of triangular large cross section will be formed by the dash board 32, the inner floor panel 33 and the front section of the outer floor panel 29. In the neighborhood of the central posts 34 the members 35 of the thresholds may be connected with each other by a downwardly presenting channel transverse beam 36. This beam supporting the front units may be closed by a wall 37 shown in dotted lines to constitute a box-shaped beam.

Similarly, the support 38 for the rear seat forms a transverse box-shaped carrier of large cross section. The outer floor panel 29 and the inner floor panel 30 are extended beneath the rear seat in the region of the transverse tunnel 39 accommodating the rear axles and in the region of the baggage compartment thus forming a rearwardly extending double wall. Only directly above the axle the outer wall may be interrupted and formed with flanges 40 contacting the inner wall for the purpose of increasing the clearance for the movement of the rear axle.

The floor panels 29, 30 are extended into the channels 41 and 42 of the top unit constituting a slanting rear wall integral with the top 43, 44 proper.

The top channels 43, 44 extend gradually into the external shell 45 and internal shell 46 of the front wall and of the cowl and these latter may terminate at the dash board 32. However, the dash board may be a two-walled continuation of the cowl or may be constructed as shown in Fig. 3 in dotted lines at 47.

The outer and inner shell of the side wall has extensions 48, 49 projecting forwardly beyond the cowl and the dash board 32. These extensions serve the purpose of supporting the body on the front wheels and of carrying the engine with its accessories.

The body shown in Figs. 1, 2 and 3 is primarily designed for vehicles without any longitudinal drive shaft. In Fig. 4, however, I have shown a modification of the floor for accommodating such a drive shaft. For this purpose the floor panels 59 and 60 are connected to a centrally disposed, downwardly presenting channel member 61 which is shown as formed by a single ply but, if desired, may be made of two plies, i. e. may be formed by two channel members in nested relationship.

As shown in Fig. 5, an outer floor panel 350 of sheet metal or other suitable sheet material such as a suitable condensation product (Bakelite) is connected along its lateral margins with beam members 360, 370 constituting side sills 380 of box-shape closed by the floor panel 350.

In the center of the body an integral or composite longitudinal member 390 may be placed on the floor panel 350 constituting a closed hollow member 310 therewith for accommodating the drive shaft or other elements of the vehicle. This hollow member may be so shaped as to materially reinforce the entire floor unit.

Above the floor panel 350 and spaced therefrom there is provided a second floor panel 311 inserted between the side sills 380 or between the latter and the central member 310 if such is provided. Suitably spaced transverse struts 312 may be inserted between the floor panels 350 and 311 to reinforce the bottom unit and to keep the panels 350 and 311 properly spaced. These struts may extend through openings provided in the inner wall 370 of the side sills 380 and through the lateral walls of the central member 310. Moreover they may be connected with the edges of such openings.

Another embodiment is illustrated in Fig. 7. Within the angle formed by the floor panel 313 and the side wall members 314 of the outer shell, there are inserted angular bars 315 enclosing the upper floor panel 316 between their vertical portions. The side walls may be formed by two panels in a similar manner, the side panel 317 adjoining to the top wall of the bars 315. The elements of the top unit and of the bottom unit are preferably pressed from sheet metal but it is to be understood that my invention is not limited to this material but appears applicable to a body made of other sheet material such as condensation products (known for instance under the trademark Bakelite). The connection of the elements may be made by riveting or welding adjoining flanges as will appear from the drawings.

Numerous modifications will readily occur to anyone skilled in the art. Thus the two floor panels may be connected by reinforcing members in various manners, e. g. by interposing a corrugated sheet in lieu of the transverse struts 312.

While I have described my invention with reference to specific embodiments thereof, I wish it to be understood that my invention is not limited to the details of design but is capable of numerous modifications within the ambit of the appended claims.

What I claim is:

1. In an underframe structure for a vehicle such as an automobile; two closed box-section sills extending in the longitudinal direction of the vehicle and being spaced from each other for about the transverse width of the vehicle; each of said sills comprising an inner upright wall the height of which is about equal to the entire height of such sill and which faces the other sill; an upper floor panel and a lower floor panel; said two floor panels being vertically spaced from each other, and being in a longitudinal direction coextensive with at least a large portion of the length of said sills; the width of said panels being at least equal to the transverse space between said sills; the space between said panels being less than half the height of said sills; said floor panels having their longitudinal margins fastened in vertically spaced relation, rigidly, permanently and substantially throughout to said inner upright walls of said sills; a plurality of transverse braces being spaced from each other and arranged at intervals in the longitudinal direction of the vehicle; said braces being inserted between and rigidly fastened to said upper and lower floor panels; said floor panels together with said transverse braces and the inner walls of said sills forming closed box-section transverse reenforcing structures imparting to said underframe structure in collaboration with said sills, great load-carrying capacity, and great strength and rigidity against bending and torsion.

2. In an underframe structure for a vehicle such as an automobile; two closed box-section sills extending in the longitudinal direction of the vehicle and being spaced from each other for about the transverse width of the vehicle; each of said sills comprising an inner upright wall the height of which is about equal to the entire height of such sill and which faces the other sill; an upper floor panel and a lower floor panel; said two floor panels being vertically spaced from each other, and being in a longitudinal direction coextensive with at least a large portion of the length of said sills; the width of said panels being at least equal to the transverse space between said sills; the space between said panels being less than half the height of said sills; said floor panels having their longitudinal margins fastened in vertically spaced relation, rigidly, permanently and substantially throughout to said inner upright walls of said sills; a plurality of transverse braces being spaced from each other and arranged at intervals in the longitudinal direction of the vehicle; said braces being inserted between and rigidly fastened to said upper and lower floor panels; said transverse braces extending into the interior of said box-section sills and being fastened to the walls of the latter; said floor panels together with said transverse braces and the inner walls of said sills forming closed box-section transverse re-enforcing structures imparting to said underframe structure in collaboration with said sills great load-carrying capacity, and great strength and rigidity against bending and torsion.

3. In an underframe structure for a vehicle such as an automobile; two closed box-section sills extending in the longitudinal direction of the vehicle and being spaced from each other for about the transverse width of the vehicle; each of said sills comprising an inner upright wall the height of which is about equal to the entire height of such sill and which faces the other sill; an upper floor panel and a lower floor panel; said two floor panels being vertically spaced from each other, and being in a longitudinal direction coextensive with at least a large portion of the length of said sills; the width of said panels being at least equal to the transverse space between said sills; the space between said panels being less than half the height of said sills; said floor panels having their longitudinal margins fastened in vertically spaced relation, rigidly, permanently and substantially throughout to said inner upright walls of said sills; said lower floor panel being arranged at about the level of the lower margins of said sills and being substantially plane so as to give a smooth undersurface to the vehicle; a plurality of transverse braces being spaced from each other and arranged at intervals in the longitudinal direction of the vehicle; said braces being inserted between and rigidly fastened to said upper and lower floor panels; said floor panels together with said transverse braces and the inner walls of said sills forming closed box-section transverse re-enforcing structures imparting to said underframe structure in collaboration with said sills great load-carrying capacity, and great strength and rigidity against bending and torsion.

KURT SCHÄFER.